US009135876B2

(12) United States Patent
Xiao

(10) Patent No.: US 9,135,876 B2
(45) Date of Patent: Sep. 15, 2015

(54) ANTI-STREAKING METHOD FOR LIQUID CRYSTAL DISPLAY

(75) Inventor: Xiangchun Xiao, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 1959 days.

(21) Appl. No.: 12/125,118

(22) Filed: May 22, 2008

(65) Prior Publication Data

US 2009/0051837 A1 Feb. 26, 2009

(30) Foreign Application Priority Data

Aug. 24, 2007 (CN) .......................... 2007 1 0120732

(51) Int. Cl.
*G02F 1/133* (2006.01)
*G09G 3/36* (2006.01)

(52) U.S. Cl.
CPC ........ *G09G 3/3655* (2013.01); *G09G 2310/063* (2013.01); *G09G 2320/0261* (2013.01)

(58) Field of Classification Search
USPC .................... 345/86–104, 204, 208–210, 690
See application file for complete search history.

(56) References Cited

U.S. PATENT DOCUMENTS 5,442,370 A * 8/1995 Yamazaki et al. .............. 345/94
5,926,162 A 7/1999 Wood et al.
5,940,055 A * 8/1999 Lee ................................ 345/87
6,480,238 B1 * 11/2002 Knox et al. ................... 348/569
6,518,946 B2 * 2/2003 Ode et al. ........................ 345/98
6,924,782 B1 * 8/2005 Fujioka et al. .................. 345/92
2002/0067453 A1 6/2002 Kim et al.
2003/0151572 A1 8/2003 Kumada et al.
2005/0140634 A1 * 6/2005 Takatori .......................... 345/96
2006/0139251 A1 * 6/2006 Morosawa et al. ............ 345/76
2008/0001886 A1 1/2008 Kim et al.

FOREIGN PATENT DOCUMENTS

CN 1356682 A 7/2002
JP 06-034943 A 2/1994
KR 20030095113 A 12/2003
KR 1020030095113 * 12/2003
KR 20060128447 A 12/2006

OTHER PUBLICATIONS

USPTO NFOA dated Nov. 6, 2014, in connection with U.S. Appl. No. 12/892,022.

* cited by examiner

*Primary Examiner* — Charles V Hicks
*Assistant Examiner* — Jeffrey S Steinberg
(74) *Attorney, Agent, or Firm* — Ladas & Parry LLP

(57) ABSTRACT

The invention relates to an anti-streaking method for liquid crystal display, comprising: generating a periodic pulse voltage signal; applying the periodic pulse voltage signal to a common electrode of liquid crystal display, periodically fully biasing all pixels during the pulse generation, to generate periodic black picture. All pixels are fully biased during the pulse generation, causing the light transmissivity to be nearly lowest, thus generating periodic black screen, by applying the periodic pulse voltage signal to the common electrode of LCD, thus effectively mitigates the streaking phenomena of moving image due to the persistence of vision. Meantime, since the periodic black screen intermittently damages the fixed voltage applied on the liquid crystal, the liquid crystal molecules are subject to a strong reordering process periodically, thus the appearance of remnant image can be mitigated.

5 Claims, 4 Drawing Sheets

ANTI-STREAKING METHOD FOR LIQUID CRYSTAL DISPLAY

FIELD OF THE INVENTION

The invention relates to a control method for LCD (liquid crystal display), and particularly to an anti-streaking method for LCD.

DESCRIPTION OF THE PRIOR ART

As compared with the conventional CRT (cathode ray tube) display, when displaying still image which has little variation, LCD has the obvious advantages, such as free of flashing, etc. However, when displaying dynamic image which varies rapidly, severe streaking problem would occur, which causes the liquid crystal display technology limited in aspects of digital TV, video play and games.

Due to the display characteristic of LCD pixel, the persistence of vision of previous frame display will influence the acceptance of the next frame display image. A prominent problem in the liquid crystal display technology is that: when displaying dynamic image of a rapidly moving object, the phenomena of the streaking and remnant image of the moving object will cause motion blur.

In order to solve the streaking problem of LCD, the prior art mainly employs Black Frame Insertion method and Flashing Backlight method. Black Frame Insertion method is to insert full black medium frame based on the original video image. Flashing Backlight method is to cause the backlight of LCD to flash in a certain period.

In practice, it is shown that Black Frame Insertion method causes the brightness of LCD to decrease, which will likely cause the sense of flashing and the subjective brightness to decrease obviously, and cause the frequency of the data input clock to increase, and the requirement on the speed of the switching of liquid crystal is higher, EMI property is degraded; Flashing Backlight method requires adding backlight control technology, which increases the cost, decreases the brightness, and adversely affects the life of backlight source always in flashing status.

SUMMARY OF THE INVENTION

An object of the invention is to provide an anti-streaking method for LCD, which mitigates the streaking phenomena due to the persistence of vision and mitigates the generation of remnant image by changing the common voltage of LCD from a fixed DC voltage to a periodic pulse AC voltage.

In order to realize the above object, the invention provides an anti-streaking method for liquid crystal display, comprising:

generating a periodic pulse voltage signal; and applying the periodic pulse voltage signal to a common electrode of liquid crystal display to periodically and fully bias all pixels during the pulse generation and generate periodic black picture.

Wherein, said generating the periodic pulse voltage signal may be that: periodically outputting a low bias common voltage and a normal common voltage by controlling the ON and OFF of a pair of CMOS transistors by a pulse signal.

Wherein said generating the periodic pulse voltage signal may also be that: periodically outputting a high bias common voltage and a normal common voltage by controlling the ON and OFF of a pair of CMOS transistors by a pulse signal.

Wherein said generating the periodic pulse voltage signal may also be that: periodically outputting a high bias common voltage, a normal common voltage, a low bias common voltage, and a normal common voltage by controlling the ON and OFF of a pair of CMOS transistors by a pulse signal.

Wherein, particularly, said generating the periodic pulse voltage signal may also be that: controlling an output voltage generation circuit to periodically output a high bias common voltage, a normal common voltage, a low bias common voltage, and a normal common voltage by generating a first control signal and a second control signal which have the same period and a phase difference of 180° by a timing controller.

Based on the above technical solution, the period of the periodic pulse voltage signal is 30 Hz~150 Hz, and the duration of the periodic pulse voltage signal is 0.2 ms~15 ms. The voltage value of the high bias common voltage is 1.4~1.6 times the voltage value of a dynamic range, and the voltage value of the low bias common voltage is −0.4~−0.6 times the voltage value of a dynamic range.

The invention provides an anti-streaking method for LCD, which changes the common electrode voltage of LCD from a fixed DC voltage to a periodic AC pulse voltage. All pixels are fully biased during the pulse generation, causing the light transmissivity to be nearly lowest, thus generating periodic black screen, by applying the periodic pulse voltage signal to a common electrode of LCD. For human vision, the periodic black screen causes the persistence of vision in human eyes to be black, preparing for the next acceptance of a new picture, and the streaking phenomena is mitigated in vision, thus effectively mitigates the streaking phenomena of moving image due to the persistence of vision. Meantime, since the periodic black screen intermittently damages the fixed voltage applied on the liquid crystal, and the liquid crystal molecules are subject to a strong reordering process periodically, which will alleviate the phenomena of remnant image due to the chronical application of different fixed voltages on different pixels, thus the appearance of remnant image can be mitigated.

As compared with Black Frame Insertion method in the prior art, the invention will not decrease the brightness of LCD, and not changing the frequency of the data input clock, thus the electromagnetic radiation property is little influenced. As compared with Flashing Backlight method in the prior art, the invention does not need to add the backlight control technology, the cost is less, the brightness will not decease, and the life of backlight source will not be adversely affected. Since the backlight source is the part with the largest power in the LCD, the flashing of the backlight source will cause the higher electromagnetic radiation, the long term use of it will affect the stability of the brightness and the life of the lamp, and the human health will be adversely affected. As compared with aforementioned two methods, in the invention, the period and duration for generating the black screen are independent of the period of displaying picture, reducing the difficulty for realizing the technology, and hence the invention possesses the wide prospect of application.

The technical solutions of the invention will be described in detail with reference to the accompanying drawings and embodiments.

DETAILED DESCRIPTION OF THE INVENTION

Figure 1:
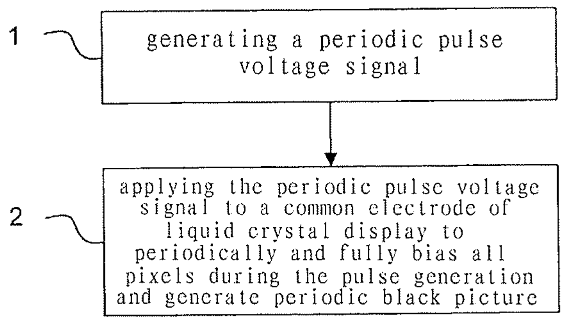
FIG. 1 is a flowchart of the anti-streaking method for LCD in the invention.

FIG. 1 is a flowchart of the anti-streaking method for LCD in the invention, and particularly is that:

Step 1 of generating a periodic pulse voltage signal;

Step 2 of applying the periodic pulse voltage signal to a common electrode of LCD, periodically fully biasing all pixels during the pulse generation, to generate periodic black picture.

The above technical solution of the invention changes the common electrode voltage of LCD from a fixed DC voltage to a periodic AC pulse voltage. All pixels are fully biased during the pulse generation, causing the light transmissivity to be nearly lowest, thus generating periodic black screen, by applying the periodic pulse voltage signal to a common electrode of LCD. For human vision, the periodic black screen causes the persistence of vision in human eyes to be black, further to prepare for the acceptance of a new picture, and to mitigate the streaking phenomena in vision, thus effectively mitigates the streaking phenomena of moving image due to the persistence of vision. Meantime, since the periodic black screen damages the fixed voltage applied on the liquid crystal intermittently, the liquid crystal molecules are subject to a strong reordering process periodically, which will alleviate the phenomena of remnant image due to the chronical application of different fixed voltages on different pixels, thus the appearance of remnant image can be mitigated.

Based on the above technical solution of the invention, applying the periodic pulse voltage signal to a common electrode of LCD has plurality of implementations. The implemental scheme of the invention will be further described with detailed embodiments.

The First Embodiment

Figure 2:
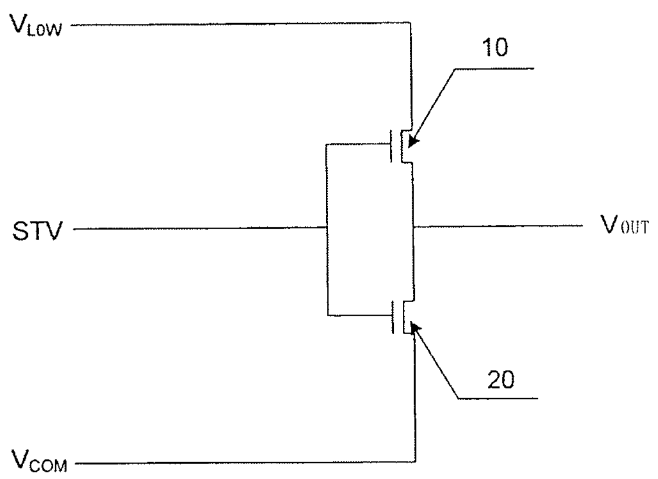
FIG. 2 is an embodying circuit diagram of a first embodiment in the invention.
Figure 3:
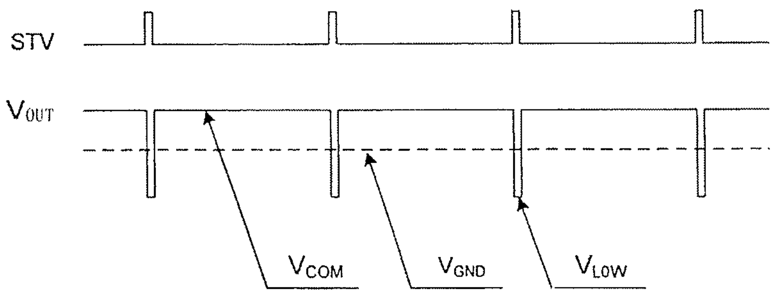
FIG. 3 is an output wave diagram of the first embodiment in the invention.

FIG. 2 is an embodying circuit diagram of the first embodiment in the invention, and FIG. 3 is an output wave diagram of the first embodiment in the invention. This embodiment is to periodically output low bias common voltage and normal common voltage, by controlling the ON and OFF of a pair of CMOS transistors by a pulse signal STV. As shown in FIG. 2, the pair of CMOS transistors in the embodying circuit of this embodiment includes NMOS transistor 10 and PMOS transistor 20, the low level of the output voltage $V_{OUT}$ is set to the low bias common voltage $V_{LOW}$, and the high level of the output voltage $V_{OUT}$ is set to the normal common voltage $V_{COM}$. When the pulse signal STV is high, NMOS transistor 10 is ON, PMOS transistor 20 is OFF, the output voltage $V_{OUT}$ outputs the low bias common voltage $V_{LOW}$ with low level (as shown in FIG. 3), the voltage value of the low bias common voltage $V_{LOW}$ is −0.4~0.6 (preferably −0.5) times the voltage value of dynamic range, wherein the voltage value of the dynamic range means the difference between the highest value of liquid crystal gray scale voltage and the lowest value of liquid crystal gray scale voltage. The low bias common voltage $V_{LOW}$ with low level is applied to the common electrode of LCD, causing all pixels to be fully biased during the pulse generation, displaying black screen; When the pulse signal STV is low, PMOS transistor 20 is ON, NMOS transistor 10 is OFF, the output voltage $V_{OUT}$ outputs the normal common voltage $V_{COM}$ (as shown in FIG. 3), the display screen displays normal image. In FIG. 3, the broken line refers to the ground potential $V_{GND}$.

In this embodiment, the period for outputting the low bias common voltage $V_{LOW}$ is 30 Hz~150 Hz, preferably 60 Hz, the pulse duration of the low bias common voltage $V_{LOW}$ is 0.2 ms~15 ms, preferably 3 ms, thus the duration of the normal common voltage $V_{COM}$ is 13.7 ms. By adjusting the period and width of the pulse, the best effect can be obtained. In practice, the low bias common voltage $V_{LOW}$ can also employ the gate OFF power $V_{OFF}$ on PCB board of LCD, thus effectively utilizing the existing power circuit.

The Second Embodiment

Figure 4:
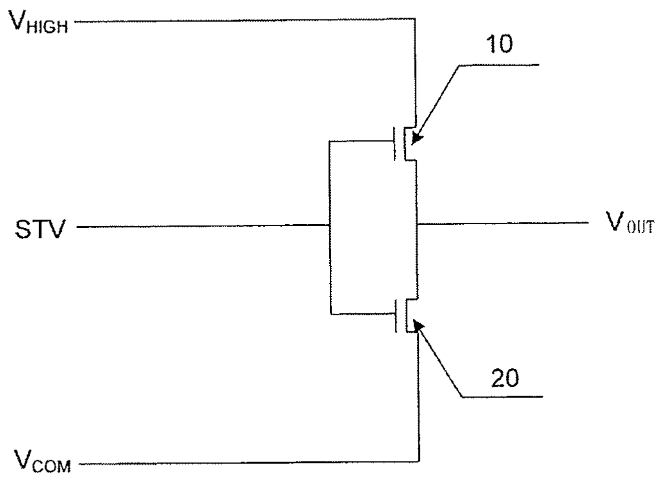
FIG. 4 is an embodying circuit diagram of a second embodiment in the invention.
Figure 5:
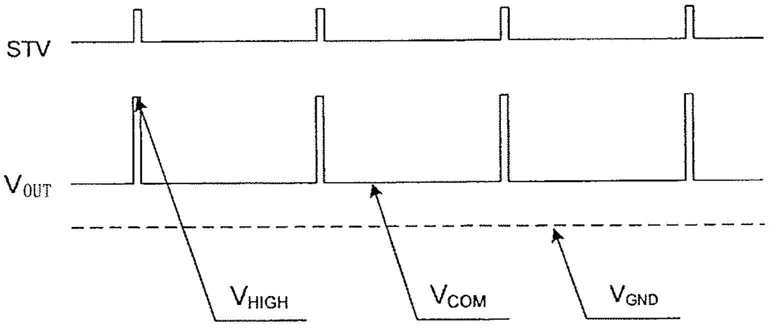
FIG. 5 is an output wave diagram of the second embodiment in the invention.

FIG. 4 is an embodying circuit diagram of the second embodiment in the invention, and FIG. 5 is an output wave diagram of the second embodiment in the invention. This embodiment is to periodically output a high bias common voltage and normal common voltage, by controlling the ON and OFF of a pair of CMOS transistors by a pulse signal STV. As shown in FIG. 4, the pair of CMOS transistors in the embodying circuit of this embodiment includes NMOS transistor 10 and PMOS transistor 20, the high level of the output voltage $V_{OUT}$ is set to the high bias common voltage $V_{HIGH}$, the low level of the output voltage $V_{OUT}$ is set to the normal common voltage $V_{COM}$. When the pulse signal STV is high, NMOS transistor 10 is ON, PMOS transistor 20 is OFF, the output voltage $V_{OUT}$ outputs the high bias common voltage $V_{HIGH}$ with high level (as shown in FIG. 5), and the voltage value of the high bias common voltage $V_{HIGH}$ is 1.4~1.6 (preferably 1.5) times the voltage value of dynamic range, wherein the voltage value of the dynamic range means the difference between the highest value of liquid crystal gray scale voltage and the lowest value of liquid crystal gray scale voltage. The high bias common voltage $V_{HIGH}$ with high level is applied to the common electrode of LCD, causing all pixels to be fully biased during the pulse generation, displaying black screen. When the pulse signal STV is low, PMOS transistor 20 is ON, NMOS transistor 10 is OFF, the output voltage $V_{OUT}$ outputs the normal common voltage $V_{COM}$ (as shown in FIG. 5), the display screen displays normal image. In FIG. 5, the broken line refers to the ground potential $V_{GND}$.

In this embodiment, the period for outputting the high bias common voltage $V_{HIGH}$ is 30 Hz~150 Hz, preferably 30 Hz, the pulse duration of the high bias common voltage $V_{HIGH}$ is 0.2 ms~15 ms, preferably 10 ms, thus the duration of the normal common voltage $V_{COM}$ is 23.3 ms. By adjusting the period and width of the pulse, the best effect can be obtained. In practice, the high bias common voltage $V_{HIGH}$ can also employ the gate ON power $V_{ON}$ on PCB board of LCD, thus effectively utilizing the existing power circuit.

The Third Embodiment

Figure 6:
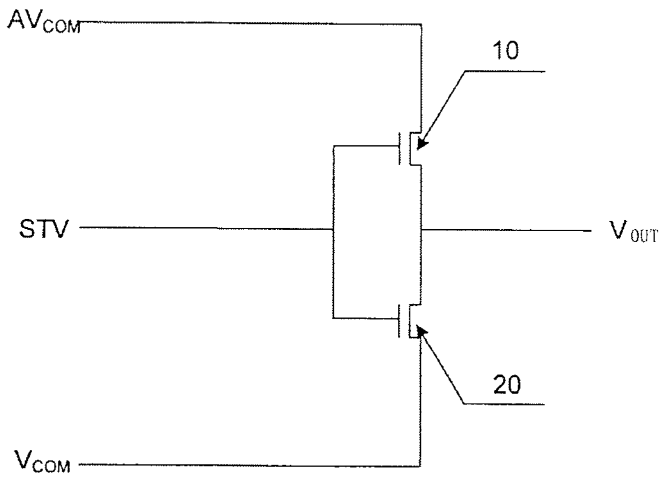
FIG. 6 is an embodying circuit diagram of a third embodiment in the invention.
Figure 7:
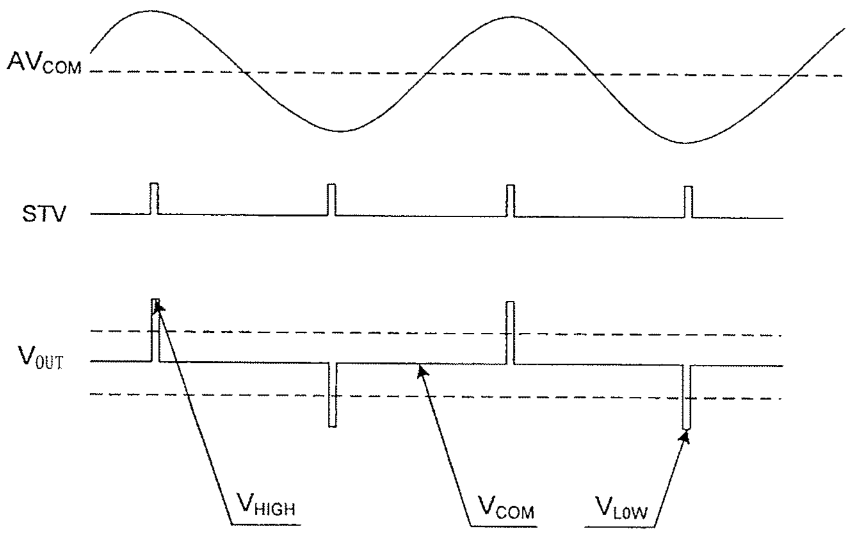
FIG. 7 is an output wave diagram of the third embodiment in the invention.

FIG. 6 is an embodying circuit diagram of the third embodiment in the invention, and FIG. 7 is an output wave diagram of the third embodiment in the invention. This embodiment is to periodically output a high bias common voltage, a normal common voltage, a low bias common voltage, and a normal common voltage, by controlling the ON and OFF of a pair of CMOS transistors by a pulse signal STV. As shown in FIG. 6, the pair of CMOS transistors in the embodying circuit of this embodiment includes NMOS transistor 10 and PMOS transistor 20, the high level of the output voltage $V_{OUT}$ is set to the high bias common voltage $V_{HIGH}$, the low level of the output voltage $V_{OUT}$ is set to the low bias common voltage $V_{LOW}$, the medium level of the output voltage $V_{OUT}$ is set to the normal common voltage $V_{COM}$. The input signal of AC voltage $AV_{COM}$ is connected with NMOS transistor 10, and the center of amplitude of AC voltage $AV_{COM}$ is the normal common voltage $V_{COM}$ and synchronized with pulse signal STV. When the pulse signal STV is high, NMOS transistor 10 is ON, PMOS transistor 20 is OFF, the output voltage $V_{OUT}$ outputs the high bias common voltage $V_{HIGH}$, and the voltage value of the high bias common voltage $V_{HIGH}$ is 1.4~1.6 (preferably 1.5) times the voltage value of dynamic range. The high bias common voltage $V_{HIGH}$ is applied to the common electrode of LCD, causing all pixels to be fully biased during the pulse generation, and displaying black screen. When the pulse signal STV is low, PMOS transistor 20 is ON, NMOS transistor 10 is OFF, the output voltage $V_{OUT}$ outputs the normal common voltage $V_{COM}$ (as shown in FIG. 7), the display screen displays normal image. When the pulse signal STV is high again, NMOS transistor 10 is ON, PMOS transistor 20 is OFF, the output voltage $V_{OUT}$ outputs the low bias common voltage $V_{LOW}$, and the voltage value of the low bias common voltage $V_{LOW}$ is −0.4~−0.6 (preferably −0.5) times the voltage value of dynamic range. The low bias common voltage $V_{LOW}$ is applied to the common electrode of LCD, causing all pixels to be fully biased during the pulse generation, displaying black screen. When the pulse signal STV is low again, PMOS transistor 20 is ON, NMOS transistor 10 is OFF, and the output voltage $V_{OUT}$ outputs the normal common voltage $V_{COM}$ (as shown in FIG. 7). The voltage value of dynamic range means the difference between the highest value of liquid crystal gray scale voltage and the lowest value of liquid crystal gray scale voltage, as shown by the difference between the two broken lines in FIG. 7, and in general, the lower broken line is close to the numeral value of ground potential.

In this embodiment, the period for outputting the high bias common voltage $V_{HIGH}$ is 30 Hz~150 Hz, preferably 50 Hz, the pulse duration of the high bias common voltage $V_{HIGH}$ is 0.2 ms~15 ms, preferably 2 ms, the period for outputting the low bias common voltage $V_{LOW}$ is 30 Hz~150 Hz, preferably 50 Hz, the pulse duration of the low bias common voltage $V_{LOW}$ is 0.2 ms~15 ms, preferably 2 ms, thus the duration of the normal common voltage $V_{COM}$ is 8 ms. By adjusting the period and width of the pulse, the best effect can be obtained.

The Fourth Embodiment

Figure 8:
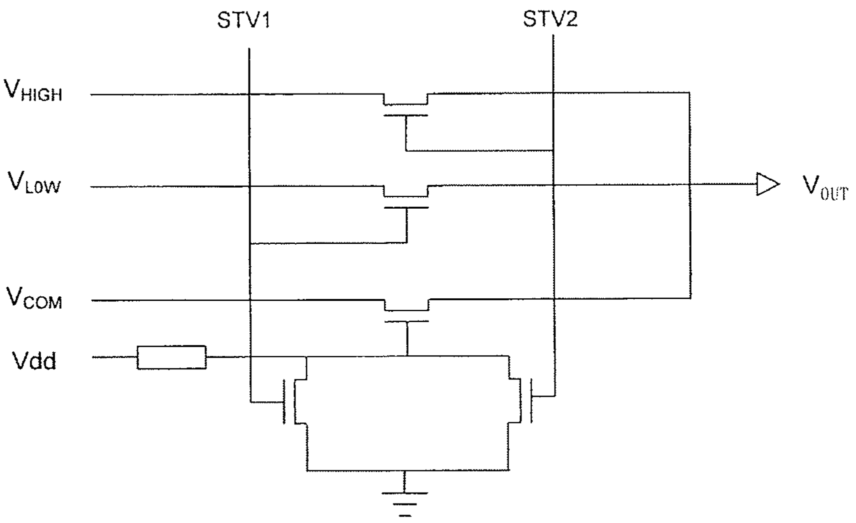
FIG. 8 is an embodying circuit diagram of a forth embodiment in the invention.
Figure 9:
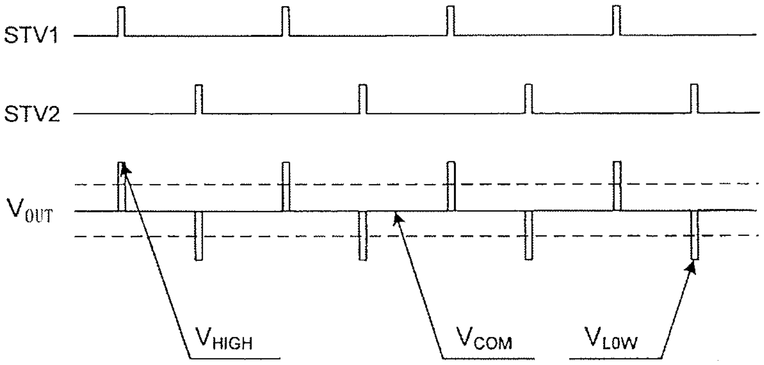
FIG. 9 is an output wave diagram of the forth embodiment in the invention.

FIG. 8 is an embodying circuit diagram of the forth embodiment in the invention, and FIG. 9 is an output wave diagram of the forth embodiment in the invention. This embodiment is to control a output voltage generation circuit to periodically and sequentially output a high bias common voltage, a normal common voltage, a low bias common voltage, and a normal common voltage, by generating a first control signal and a second control signal which have the same period and a phase difference of 180° by a timing controller. The embodying circuit of this embodiment includes the timing controller and the output voltage generation circuit, and the timing controller is for generating a first control signal STV1 and a second control signal STV2 which have the same period and a phase difference of 180°, and controlling the output voltage generation circuit as shown in FIG. 8. The high level of the output voltage $V_{OUT}$ is set to the high bias common voltage $V_{HIGH}$, the low level of the output voltage $V_{OUT}$ is set to the low bias common voltage $V_{LOW}$, and the medium level of the output voltage $V_{OUT}$ is set to the normal common voltage $V_{COM}$. When the first control signal STV1 is high, the output voltage $V_{OUT}$ of the output voltage generation circuit outputs the high bias common voltage $V_{HIGH}$, the voltage value of the high bias common voltage $V_{HIGH}$ is 1.4~1.6 times the voltage value of dynamic range, and the high bias common voltage $V_{HIGH}$ is applied to the common electrode of LCD, causing all pixels to be fully biased during the pulse generation, displaying black screen. When the first control signal STV1 is low, the output voltage $V_{OUT}$ of the output voltage generation circuit outputs the normal common voltage $V_{COM}$ (as shown in FIG. 9), and the display screen displays normal image. When the second control signal STV2 is high, the output voltage $V_{OUT}$ of the output voltage generation circuit outputs the low bias common voltage $V_{LOW}$, the voltage value of the low bias common voltage $V_{LOW}$ is −0.4~−0.6 times the voltage value of dynamic range, and the low bias common voltage $V_{LOW}$ is applied to the common electrode of LCD, causing all pixels to be fully biased during the pulse generation, and displaying black screen. When the second control signal STV2 is low, the output voltage $V_{OUT}$ of the output voltage generation circuit outputs the normal common voltage $V_{COM}$ (as shown in FIG. 9), and the display screen displays normal image. Vdd is the power voltage of the digital circuit. The voltage value of the dynamic range means the difference between the highest value of liquid crystal gray scale voltage and the lowest value of liquid crystal gray scale voltage, as shown by the difference between the two broken lines in FIG. 9, and in general, the lower broken line is close to the numeral value of ground potential.

In this embodiment, the period for outputting the high bias common voltage $V_{HIGH}$ is 30 Hz~150 Hz, preferably 38 Hz, the pulse duration of the high bias common voltage $V_{HIGH}$ is 0.2 ms~15 ms, preferably 1 ms, the period for outputting the low bias common voltage $V_{LOW}$ is 30 Hz~150 Hz, preferably 38 Hz, the pulse duration of the low bias common voltage $V_{LOW}$ is 0.2 ms~15 ms, preferably 1 ms, thus the duration of the normal common voltage $V_{COM}$ is 12.1 ms. By adjusting the period and width of the pulse, the best effect can be obtained.

Those skilled in the art would appreciate that all or part of the steps for realizing the above method embodiments can be implemented by a hardware associated with program instruction, said program can be stored in a computer-readable storage medium, when executed, said program can perform the steps comprising the above method embodiments; said storage medium includes a medium such as ROM, RAM, magnetic disk, or optical disk and so on, which can store program code.

Finally, it is noted that the above embodiments is only for explaining the technical solution of the invention, and not for limitation. Although the invention has been described in detail with reference to the preferred embodiments, those skilled in the art would appreciate that the technical solution of the invention can be modified or replaced without depart from the spirit and scope of the technical solution of the invention.

What is claimed is:

1. An anti-streaking method for liquid crystal display, comprising:

generating a periodic pulse voltage signal by controlling the ON and OFF of a pair of CMOS transistors by a pulse signal;

applying the periodic pulse voltage signal to a common electrode of liquid crystal display to periodically and fully bias all pixels during the pulse generation and generate periodic black picture, and wherein said generating the periodic pulse voltage signal is specifically that: controlling an output voltage generation circuit to periodically output a high bias common voltage, a normal common voltage, a low bias common voltage, and a normal common voltage by generating a first control signal and a second control signal which have the same project and a phase difference of 180° by a timing controller.

2. The anti-streaking method for liquid crystal display according to claim 1, wherein the frequency of the periodic pulse voltage signal is 30 Hz~150 Hz.

3. The anti-streaking method for liquid crystal display according to claim 1, wherein the duration of the pulse of the periodic pulse voltage signal is 0.2 ms~15 ms.

4. The anti-streaking method for liquid crystal display according to claim 1, wherein the voltage value of the high bias common voltage is 1.4~1.6 times a difference between a highest grey scale voltage value of the liquid crystal display and a lowest grey scale voltage value of the liquid crystal display.

5. The anti-streaking method for liquid crystal display according to claim 1, wherein the voltage value of the low bias common voltage is ~0.4~–0.6 times a difference between a highest grey scale voltage value of the liquid crystal display and a lowest grey scale voltage value of the liquid crystal display.

* * * * *